(12) United States Patent
Fabbrizio et al.

(10) Patent No.: US 7,746,990 B1
(45) Date of Patent: Jun. 29, 2010

(54) PROVIDING CALLED NUMBER CHARACTERISTICS TO CLICK-TO-DIAL CUSTOMERS

(75) Inventors: Giuseppe Di Fabbrizio, Florham Park, NJ (US); Narendra K. Gupta, Dayton, NJ (US)

(73) Assignee: AT&T Corp., New York, NY (US)

( * ) Notice: Subject to any disclaimer, the term of this patent is extended or adjusted under 35 U.S.C. 154(b) by 1224 days.

(21) Appl. No.: 11/248,625

(22) Filed: Oct. 12, 2005

(51) Int. Cl.
*H04M 15/00* (2006.01)
(52) U.S. Cl. .............................. 379/114.13; 379/88.17
(58) Field of Classification Search ............ 379/355.02, 379/88.17, 114.13
See application file for complete search history.

(56) References Cited

U.S. PATENT DOCUMENTS

| | | | | |
|---|---|---|---|---|
| 5,943,055 A | * | 8/1999 | Sylvan | ........................ 715/839 |
| 5,991,382 A | * | 11/1999 | Bayless et al. | .............. 379/136 |
| 6,341,128 B1 | * | 1/2002 | Svedberg | .................... 370/352 |
| 6,381,324 B1 | | 4/2002 | Shaffer | |
| 6,404,877 B1 | | 6/2002 | Bolduc | |
| 6,654,725 B1 | * | 11/2003 | Langheinrich et al. | ... 705/14.52 |
| 6,681,008 B2 | | 1/2004 | Bolduc | |
| 6,760,746 B1 | | 7/2004 | Schneider | |
| 6,870,828 B1 | | 3/2005 | Giordano | |
| 6,950,402 B2 | | 9/2005 | Mishra | |

* cited by examiner

*Primary Examiner*—Simon Sing
(74) *Attorney, Agent, or Firm*—Greenberg Traurig, LLP

(57) ABSTRACT

A system and method to provide content and call attributes for a destination phone number using a click-to-dial connection includes accepting a query, retrieving links to a document, and searching through cached data using the query to identify relevant or destination number information. If no match is found, the method continues with accessing the document identified by the link for identifying relevant number information and creating a click-to-dial icon to link to the relevant numbers included in the relevant phone number information identified by the query. Next, a popup box for content relevant to the click-to-dial icon and a click feature on the popup box are created to retrieve call destination attributes for viewing by a user. Further, computer instructions create at least one communication connection between two communication devices after viewing call destination attributes.

24 Claims, 2 Drawing Sheets

PROVIDING CALLED NUMBER CHARACTERISTICS TO CLICK-TO-DIAL CUSTOMERS

CROSS REFERENCE TO RELATED APPLICATIONS

Field

The embodiments relate to systems, methods, and computer instructions on computer readable media for providing content and call attributes for a destination phone number using a click-to-dial connection.

BACKGROUND

Information search and retrieval services for locating relevant phone numbers and phone number information has improved with advancements in automation to some extent. Generally, information searches to find or locate a phone number have entailed a standard manual practice of looking up the number in the yellow pages and, then, dialing the number to determine if the phone number is for the correct person or entity.

Improvements to information search methods have evolved with information searches through the World Wide Web network using a search engine, such as Google or some other search engine for information on a particular individual or group of individuals regarding relevant phone numbers. However, these methods can be time-consuming and can lack the ability to match selected destination phone numbers that were responsive to the general searches performed on the network.

Thus, a method and a system are needed to provide automated information about a called relevant phone number to a user and include using a click-to-dial service to connect to the correct particular person or entity. Further, there is a need to provide improved response time and a more efficient customer care strategy for information searches and retrievals.

The present embodiments address these needs.

SUMMARY

The embodiments relate to systems, methods, and computer instructions on computer readable media for providing a quick and efficient search for a relevant phone number, also termed a destination phone number, and using a click-to-dial connection to enable communication for a customer to the destination number.

The embodied methods include computer executable instructions on computer readable media for accepting a query, retrieving a link to a document, and searching through cached data on the World Wide Web using the query to identify relevant phone number information. If the relevant phone number is not found, then the method continues with accessing the document identified by the link for identifying any relevant phone number information and creating a click-to-dial icon to link to the relevant phone number or phone numbers that are included in the relevant phone number information identified by the query. Next, a popup box for content relevant to the click-to-dial icon, and a click feature on the popup box, are created to retrieve call destination attributes for viewing by a user.

The methods include computer instructions for providing at least one communication connection, after viewing the call destination attributes, between a first communication device of the customer and a second communication device, to which the relevant or destination phone number pertains.

BRIEF DESCRIPTION OF THE DRAWINGS

The detailed description will be better understood in conjunction with the accompanying drawings as follows.

Figure 1:
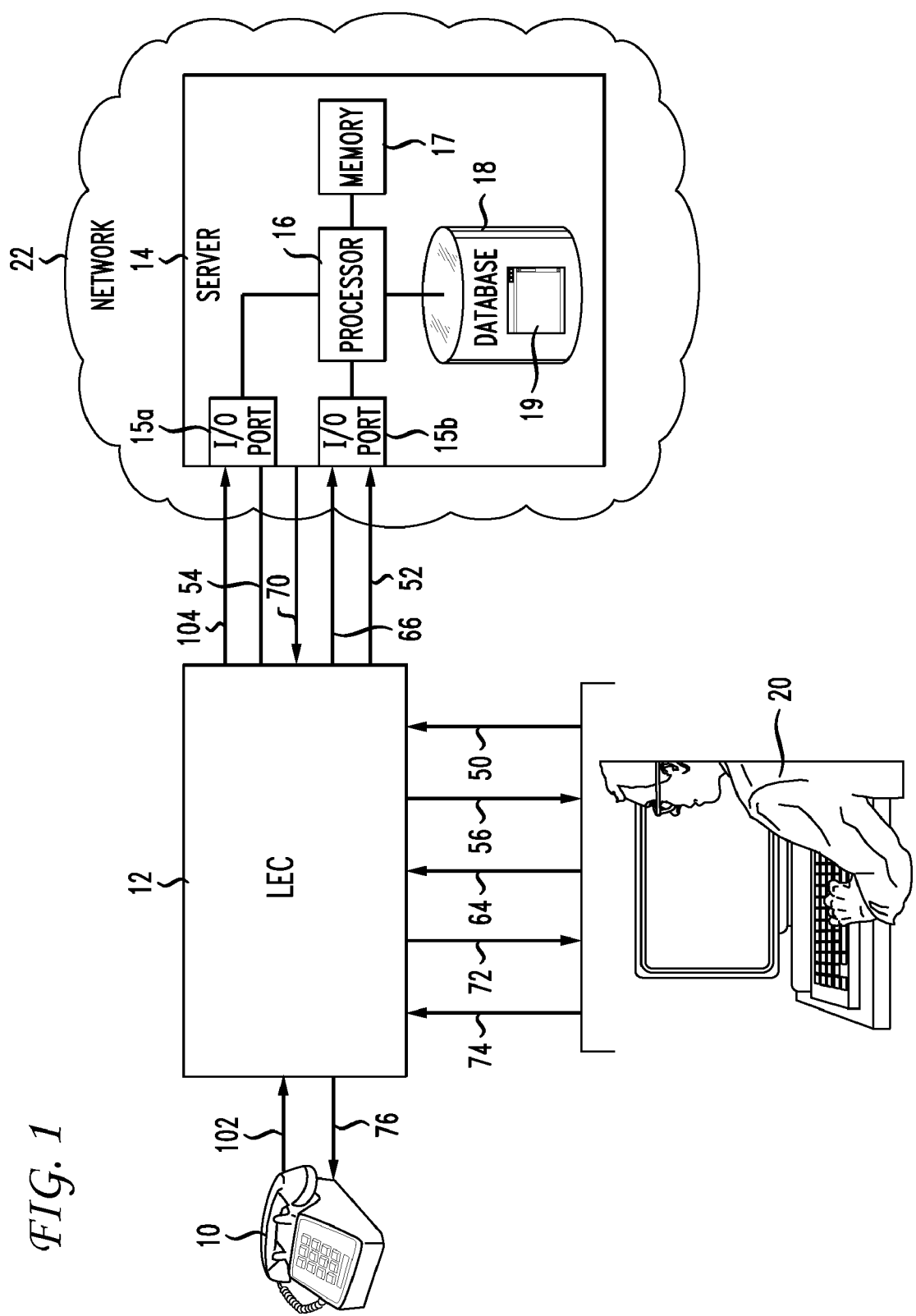
FIG. 1 depicts a diagram of an embodiment of establishing a communication connection.

The present embodiments are detailed below with reference to the listed Figures.

DETAILED DESCRIPTION OF THE EMBODIMENTS

Before explaining the presently disclosed embodiments of the invention in detail, it is to be understood that the invention is not limited to the particular embodiments, and that the invention can be practiced or carried out in various ways.

The embodiments include a system, a computer readable medium, and a method for quickly searching for a relevant phone number, also termed a destination phone number, using a search engine on the World Wide Web. Content associated with a relevant phone number is reviewed and, a single click feature is created and used to enable communication from a customer to a destination phone number.

The embodiments are user friendly. The embodiments can be integrated into a current search engine. The embodiments can be a stand alone system for adding a click-to-dial feature to a search engine to establish a phone communication between a first communication device and a second communication device.

The embodiments can benefit businesses by quickly connecting customers to a website with a desired number. By checking content related to that number and using a click-to-dial feature, the correct person in that business is connected to the desired destination number with a single click connection.

For example, a first user of a cell service can quickly and easily contact another user of the same cell service. The embodiments allow the first user to be sure that the person being called is the correct entity by checking related content. For example, if a company advertises itself as "Headhunter" for marine toilets, an uncertainty or ambiguity can occur if there are two "Headhunters", such as one company in Fort Lauderdale and one company in Seattle. Using the present embodiments, a caller can check for content prior to a single clicking on the call to the Headhunter to ensure that the Fort Lauderdale company is being contacted.

Similarly, a customer wanting to talk to Betty Smith in a large company, such as AT&T, might find that Betty Smiths work for the company. The present embodiments can permit content to be viewed to ensure that Betty Smith of AT&T Research is the correct destination phone number, rather than Betty Smith of Long Range Planning at AT&T. Accordingly, embodiments can allow a customer to click on a click-to-dial icon linking a number in a document to the correct person at the large business after viewing content from a database connected to the server providing the website for the information search or query.

The embodied systems include a server that can monitor the destination communication device and provide profiles on the destination number to verify the characteristics of the destination number being desired by the user or customer for the communication.

Embodiments can be computer readable medium for accepting a query and retrieving links to web pages identified by the query, wherein the web pages include the click-to-dial icon and a popup box that provides content on the destination number for real-time data on the destination number. The computer readable medium can further have computer instructions for establishing the at least one communication connection from the customer to the destination communication device.

Alternative embodiments can be for systems that establish a communications connection. The connection can be established using voice recognition software, a handwriting recognition software, typed characters, mouse clicks, combinations thereof, and the like. The communications connection can be input to the system to retrieve the webpage with phone numbers of interest.

The systems can include a first communication device of a customer and a second communication device, such as a terminal of the destination number. The systems can include search means, access means, and click-to-dial means. The search means can be computer instructions on a computer readable media and hereafter termed "search software." The access means can be computer instructions on a computer readable media and are hereafter termed "access software." The click-to-dial means can be computer instructions on a computer readable media and are hereafter termed "click-to-dial software."

The search software can be adapted to accept a query such as an "AT&T phone problem." The search software can be a standard search engine, such as Google®; a question and answer system, such as AskJeeves®; an intelligent dialog system; or combinations thereof. The input to the search software can be in the form of text (such as, keywords) or can be a spoken phrase (such as, a code, a natural language, or combinations thereof).

The search software can display links to documents, wherein activating one of the links retrieves the document and then displays the document. When links are formed, a click-to-dial link can be floating on the document retrieved. Examples of floating icons are a window displaying only the click-to-dial link, a click-to-dial link without a window, a link embedded in the retrieved document, and other ways of displaying a link for any document. The phone number associated with the floating link can change, based on the content of the document that is displayed. For example, if the floating link was on the "home page" or "main page" and a user followed a link on the "home page" that took the user to the technical support page for the business, then the floating click-to-dial icon can change from being connected to a general operator at the business to a technical support consultant.

The access software can be adapted to search for relevant phone numbers after using the query to identify relevant phone number information. For example, if the query is an "AT&T phone problem", the click-to-dial icon can be connected to Technical Support. If the query is regarding an "AT&T phone", the click-to-dial icon can be a connection to the AT&T Sales Department. The access software can create one or more icons to link the first communication device to the relevant phone number identified by the query. The access software can provide a popup box with content information that can be viewed by the customer of the first communication device. Content for viewing can be minimal, such as a name and address. Alternatively, the content can be maximal, such as with details on a division, products sold, or services offered.

The click-to-dial icon can be a phone symbol, an underlined text, a bold text, a different font from surrounding text, a highlighted text, a different color from surrounding text, or combinations thereof. The first communication device of the customer can be used for forming one or more communication connections between the first communication device and the second communication device, which holds the destination phone number.

Examples of the first communication device, the second communication device, or both the first communication device and the second communication device include computers, personal digital assistants, Voice over Internet Protocol phones, public switch telephone network phones, soft phones, cell phones, and combinations thereof. An example of a computer that can be used as a communication device is an HP®Compaq® NC6000, a Nokia® wireless phone, a Blackberry®, a Palm Pilot™, or a similar device.

When implementing the embodiments, a single click-to-dial icon can be used for each document. Alternatively, multiple click-to-dial icons can be used for a single document. For example, a document can have a phone symbol for one number and an underlined phone number as the second number.

Search software can retrieve two of the same document. When two of the same document has been retrieved, the access software uses the same click-to-dial icon for each document returned by the search software to limit the presentation to the user of multiples of the same phone number. The popup content boxes can be the same for the same click-to-dial icon.

The access software can perform a scan of documents retrieved by the search software. The access software can scan the retrieved documents identified by the search software for phone numbers listed in those documents and keywords identifying those phone numbers, which were used in the query.

If phone numbers with keywords matching the words of the query are not found, the access software reformulates the query using semantics (search for words with the same meaning) or syntactics (search for expressions with the same meaning) for relevant telephone numbers on the documents identified by the search software.

For example, if the query was for an "AT&T phone problem", the search software can find documents that are related to the query. The access software can search cached data for phone number information or scan the documents for identifiers relative to the query. Content can then be provided in a popup box associated with the click-to-dial icon for the retrieved phone number.

Continuing with this example, the access software can connect the first communication device to a second communication device at AT&T Technical Support and not an AT&T sales or a general AT&T number using the click-to-dial icon and review of the popup content box.

In scanning the documents, the access software can recognize phone numbers, can distinguish a region surrounding relevant phone numbers, and can search the region for identifiers relevant to the input query. Alternatively, the access software can recognize identifiers relevant to the input query, can distinguish a region surrounding the identifiers, and can search the region for phone numbers. The region can include phone number information, which can include phone numbers and identifiers. Examples of identifiers include an industry standard code, a toll free number, an area code, a number, a word, a property or properties that identify the phone number, a title of a webpage, a symbol, a section heading, a paragraph title, and combinations thereof.

The access software can rank the phone numbers from relevant phone number information according to the identity and the proximity between the query and the identifiers within the region. The identity can be the semantic or syntactic difference between the identifiers and the query. The term proximity refers to the number of words away from a phone number, the coordinate distance of the phone number, or combinations thereof. The coordinate distance can be based on a measurement between the phone number and the identifiers and can be measured in inches, meters, pixels, or other distance measurements. Proximity can be established by ranking a phone number by a scoring system. For example, a proximity 5 can mean the identifiers are next to the phone numbers; a proximity 3 can mean the identifiers are in the same line as the phone number; and a proximity 1 can mean the identifiers are on the same document as the phone numbers.

A phone number with the highest proximity ranking can be extracted and associated with the click-to-dial icon. When the scoring has been completed and no phone numbers with scores above a preset threshold are found, the access software is designed to prevent a click-to-dial icon from being generated. When the system is not confident that the phone number with the highest proximity score is the correct relevant phone number to provide to a user, then a click-to-dial icon is not generated. Examples of relevant phone number information include a relevant phone number and an identifier. Examples of an identifier includes a standard industry code, a toll free number, an area code, numbers, words, properties that identify the phone number, a title of a webpage, symbols, a section heading, a paragraph title or combinations thereof.

Relevant phone information can be cached as "cached data." Cached data can be updated with information provided by the customer or updated by scanning the identified documents. A date on the cached data can be used to identify the last update to the document. Examples of cached data include phone numbers, identifiers, previous queries, dates the cached data was stored, or combinations thereof. Content information for popup boxes can be cached. Information on the answering profile of the destination number can be stored and cached.

A document owner can supply data to be cached, such as the relevant phone number is a fax number. The document owner can supply an indication that the phone number is only answered by an automated answering service. The document owner can supply an indication of the type of destination that the destination number services, such as a multi-line phone service center. Examples of documents include web pages, advertisements, other multimedia documents, and combinations thereof.

The click-to-dial software can establish one or more communication connections from the first communication device to the second communication device. The communication connection can be formed using a local exchange connection that uses Voice over Internet Protocol, a public switch telephony network, or combinations thereof.

The provider of the access software can use embodied methods and systems to generate payments. The payments can be received by the access software provider (e.g., the owner of the search page) from the document provider (e.g., the owner of a website) when a communication connection is established to the document provider, and the document provider is also the owner of the phone number. In an alternative embodiment, payment can be received by the access software provider (e.g., the owner of the search page) from a user conducting a search (e.g., a customer) when a communication connection is established to the document provider, and the document provider has not agreed to pay for a click-to-dial link to be associated with their documents. The document provider can have only a click-to-dial link on their document if the document provider agrees to pay a royalty. The embodiments can include receiving payment by the access software provider from an owner of a phone number when the click-to-dial icon is activated.

Another embodiment provides for a method of creating a communication connection from a first communication device to a second communication device that is quicker and easier to use with less actions for a business than are currently in existence. The method for establishing a communication connection between a first communication device and a second communication device can include accepting a query by search software and retrieving links to documents using the search software. The links can connect to content popup boxes that can retrieve real-time information from cached data or a data storage concerning attributes of the destination number or terminal associated with the destination number. The method can include associating the relevant phone number with at least one click-to-dial icon.

If the connection is lost, the click-to-dial icon can be reactivated in order to reestablish the communication connection between a first communication device and a second communication device.

The method can include filtering the retrieved relevant phone numbers that were retrieved based on: a user's special request, a region, a last updating of a document, a type of document, language, or combinations thereof. Examples of document types include a word document, an XML document, a portable document file, or any other type of document used on the World Wide Web, or combinations thereof.

The embodied method can include updating cached data, if cashed data is used. The cache data can be updated when the date of a retrieved document is newer than the date the data was stored as cached data.

The access software can limit the search of documents for phone numbers to specified levels. For example, a single page [A] might link to two pages [B] and [C], wherein page [B] might link to page [D] and [E]. Page [A] might be considered level 1; page [B] and page [C] might be considered level 2; and page [D] and page [E] might be considered level 3. The access software can limit a scan of retrieved documents to a specified number of levels, such that level 1 or levels 1 and 2 are searched. The use of levels to filter a search can reduce the time needed to scan every level before deciding what number to associate with the click-to-dial icon.

With regard to the figures, FIG. 1 relate to steps in a calling process and appear adjacent to network elements performing the steps or to the links connecting the network elements. The embodied apparatus for providing telecommunication information services can include a server (14) and a processor (16).

The surrounding network can include a caller terminal for a destination number (10), a local exchange carrier (LEC) (12), a server (14), with I/O ports (15*a*, 15*b*), in communication with a processor (16) with memory (17), and an associated data storage (18) with a content database (19) for providing web page information based on a query from a user or a business customer. A business customer (20) is shown employing the present service using a network which is represented by a network cloud (22). Computer instructions are resident in the memory of the processor in the data storage containing the database for causing the processor to provide a certain web page to the business customer based on a query made by the customer.

In FIG. 1, the customer (20) communicates with a signal (50) from a graphical user interface (GUI) using a user device, such as a computer, personal digital assistant, cellular phone, or similar device. The user device enables contact with a network to the local exchange carrier (LEC) and then to the network for a communication (52). The customer (20) can establish a connection with a server (14) and queries the server for a webpage over the network (22).

The server provides a communication (54) that can include a webpage (55) back to the LEC (12) and then to the customer (20) via an additional communication (56).

Figure 2:
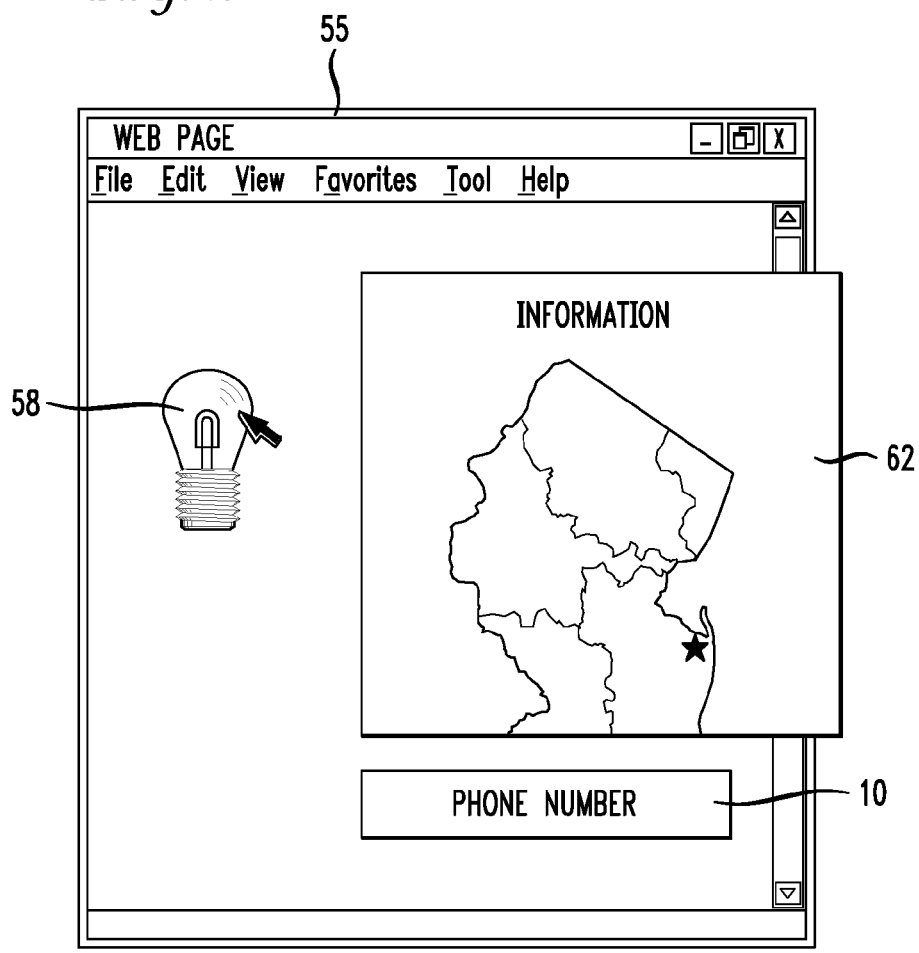
FIG. 2 depicts a web page usable with an embodiment of the invention.

FIG. 2 depicts a customer selecting a click-to-dial icon (58) from the webpage (55), wherein the click-to-dial icon is shown as a light bulb (58). When the customer (20) runs his mouse over the click-to-dial icon (58), the customer sees a popup box of content (62) related to a destination number (10). The popup box of content (62) is shown in FIG. 2 as the name of the business associated with the destination number, two of the services provided by the business and the city and state in which the business is located.

As seen in FIG. 1, the customer (20) can click on the content popup box (62) to form a communication (64) and (66) with the content database (19) via the server (14) and the LEC (12) for additional content on the destination number. The content database (19) of the data storage (18) maintains communication with the destination number via the LEC (12) with communications (102 and 104) and can provide real-time answering profiles on the destination number (10) to the business customer (20) when the popup box is clicked through communications (70 and 72) via the LEC (12).

If the business customer desires and after viewing the content information, the customer (20) can click on the click-to-dial icon to establish a connection (74 and 76) with the destination number (10).

The real-time answering profiles can include an indication that the destination number is a phone number; an indication that the destination number is a fax number as the destination number; indications concerning latencies in answering; an indication that the destination number is answered by an answering machine; an indication that the destination number is answered by a human; indications concerning the best times to call; lists of previous calls made to the destination number; and other call attributes that are traceable or trackable.

The embodiments allow for mined information to be augmented with real traffic records, so that the telecommunication system provides better contact information to the caller based on actual usage of the destination number and calls to the destination number.

In another embodiment, the information on the answering profile of a destination number can be used to order the click-to-dial buttons. Ordering the click-to-dial button can include placing the click-to-dial buttons in a priority order of usage based on their expected rate of success in reaching a human, or transmitting a fax, or other desirable parameters.

This click-to-dial process can be implemented in three different ways. First, a sponsoring business can simply provide information on a destination number during provisioning of the number on a webpage. Alternatively, the click-to-dial process, along with content information can be provided automatically to a user from a server that continuously monitors and tracks transactions to a destination number. Third, meta tags can be installed on the webpage provided by the server, wherein the tags specify the needed information requested by the mining application. Combinations of these techniques can be used.

While these embodiments have been described with emphasis on the embodiments, it can be understood that within the scope of the appended claims, the embodiments might be practiced other than as specifically described herein.

What is claimed is:

1. A computer readable medium storing computer executable instructions for instructing a processor to:
   accept a query and retrieve a link to a document;
   identify information having a phone number relevant to the query by searching through cached data using the query information, and, if the information is not found in the cached data, accessing and scanning the document tied to the retrieved link to identify the information;
   link a click-to-dial icon to the phone number in the information identified to be relevant to the query;
   create a popup box in response to a selection of the click-to-dial icon by a user; and
   retrieve call destination attributes from a database in content data storage and present the call destination attributes in the popup box for viewing by the user.

2. The computer readable medium of claim 1, further storing computer instructions for instructing the processor to establish at least one communication connection between a first communication device and a second communication device after viewing the retrieved call destination attributes.

3. The computer readable medium of claim 2, wherein each of the first and second communication devices is a computer, a personal digital assistant, a voice over internet protocol phone, a public switch telephone network phone, a soft phone, a cell phone, or combinations thereof.

4. The computer readable medium of claim 2, further storing computer executable instructions for instructing the processor to accept payment from a document provider when the communication connection is established to the document provider.

5. The computer readable medium of claim 2, further storing computer executable instructions for instructing the processor to accept payment by a consumer when a communication connection is established to a document provider.

6. The computer readable medium of claim 2, wherein the at least one communication connection is established through a voice over internet protocol, a public switch telephone network, or combinations thereof.

7. The computer readable medium of claim 2, wherein the at least one communication connection is an audio connection, a video connection, a multimedia connection, or combinations thereof.

8. The computer readable medium of claim 1, wherein call destination attributes are updated with information provided by a document owner.

9. The computer readable medium of claim 1, wherein accepting the query and retrieving the link to the document is performed by one of a search engine, a question and answering system, an intelligent dialog system, or combinations thereof.

10. The computer readable medium of claim 1, wherein the query is in the form of one of a text query, a keyword, a spoken phrase, a natural language input, or combinations thereof.

11. The computer readable medium of claim 1, wherein accepting the query is one of performed using voice recognition software, handwriting recognition software, typed characters, mouse clicks, or combinations thereof.

12. The computer readable medium of claim 1, further storing computer executable instructions for instructing the processor to scan the document to extract a plurality of phone numbers, wherein the phone number in the information is identified to be relevant to the query in the plurality of phone numbers.

13. The computer readable medium of claim 1, wherein the phone number is supplied to the cached data by a document owner.

14. The computer readable medium of claim 1, wherein the document is one of a webpage, an advertisement, a multimedia document, or combinations thereof.

15. The computer readable medium of claim 1, wherein the click-to-dial icon floats on the document when the document is retrieved.

16. A method for establishing a communication connection, the method comprising:
- a server computer accepting a query for a destination number using search means;
- the server computer retrieving a link to a document using the search means;
- the server computer identifying relevant phone number information from cached data by comparing the relevant phone number information to the query using an access means;
- the server computer retrieving phone numbers by scanning the document identified by the search means;
- the server computer searching content information related to the relevant phone number information using the access means, wherein the searching for the content information occurs when a content popup box is clicked to access the cached data on the destination number;
- the server computer identifying the destination number using the content information; and
- the server computer dial the destination phone number when a click-to-dial icon is clicked.

17. The method of claim 16, wherein the cached data comprises attributes of the destination number.

18. The method of claim 17, wherein the attributes are a member selected from the group consisting of: an indication that the destination number is a phone number; an indication that the destination number is a fax number; an indication concerning latencies in answering the destination number; an indication that the destination number is answered by an answering machine; an indication that the destination number is answered by a human; an indication concerning the best times to call the destination number; and a list of previous calls made to the destination number.

19. The method of claim 18, further comprising updating the cached data for real time data on the attributes of the destination number.

20. The method of claim 18, wherein the access means recognizes relevant phone numbers limited by one of levels, proximity, coordinate distance, or combinations thereof.

21. The method of claim 18, wherein the access means ranks relevant phone numbers according to a semantic equivalent or a syntactic equivalent between relevant phone number information and the query.

22. The method of claim 18, wherein the click-to-dial icon is one of a phone symbol, an underlined text, a bolded text, a font different from surrounding text, a highlighted text, a color different from surrounding text, or combinations thereof.

23. The method of claim 18, further comprising receiving payment by an access means provider from one of: an owner of the document when the click-to-dial icon is activated, a user of the search means when the click-to-dial icon is activated, or combinations thereof.

24. A computer server system for creating at least one click-dial-icon comprising:
- a processor; and
- a computer readable medium storing computer executable instructions to instruct the processor to:
  - accept a query and retrieve a link to a document;
  - search through cached data using the query to identify relevant phone number information;
  - search through cached data using the query to identify content information;
  - create at least one click-to-dial icon to link to a relevant phone number with content;
  - receive payment from one of: an owner of the document when the click-to-dial icon is activated, a user of the computer server system when the click-to-dial icon is activated, or combinations thereof; and
  - establish a call from a first communication device to a second communication device when the click-to-dial icon is activated.

* * * * *